(12) United States Patent
Calaway

(10) Patent No.: US 10,589,800 B1
(45) Date of Patent: Mar. 17, 2020

(54) TRACTOR-TRAILER WIND SCREEN

(71) Applicant: Mark L. Calaway, Indianapolis, IN (US)

(72) Inventor: Mark L. Calaway, Indianapolis, IN (US)

( * ) Notice: Subject to any disclaimer, the term of this patent is extended or adjusted under 35 U.S.C. 154(b) by 0 days.

(21) Appl. No.: 15/855,448

(22) Filed: Dec. 27, 2017

Related U.S. Application Data

(60) Provisional application No. 62/439,230, filed on Dec. 27, 2016.

(51) Int. Cl.
B62D 35/00 (2006.01)

(52) U.S. Cl.
CPC ......... B62D 35/001 (2013.01); B62D 35/008 (2013.01)

(58) Field of Classification Search
CPC ..... B62D 35/001; B62D 35/008; B62D 37/02
USPC ................. 296/180.2, 180.4, 180.5
See application file for complete search history.

(56) References Cited

U.S. PATENT DOCUMENTS

| 3,834,752 | A | | 9/1974 | Friedenfeld et al. |
| 4,035,013 | A | | 7/1977 | Abbott, III |
| 4,257,640 | A | * | 3/1981 | Wiley .................. B62D 35/001 105/1.2 |
| 4,518,188 | A | | 5/1985 | Witten |
| 4,685,715 | A | | 8/1987 | Hardin |
| 5,078,448 | A | | 1/1992 | Selzer et al. |
| 6,428,084 | B1 | | 8/2002 | Liss |
| 7,073,845 | B2 | * | 7/2006 | Ortega ................. B62D 35/001 296/180.2 |
| 7,617,625 | B2 | * | 11/2009 | Storm ..................... G09F 11/29 296/180.2 |
| 9,550,535 | B2 | * | 1/2017 | Malone ............... B62D 35/001 |
| 2011/0037290 | A1 | * | 2/2011 | Pickering ............ B62D 35/001 296/180.2 |
| 2011/0068602 | A1 | * | 3/2011 | Burrows .............. B62D 35/001 296/180.1 |
| 2011/0068604 | A1 | | 3/2011 | Neuberger et al. |

FOREIGN PATENT DOCUMENTS

EP 1870320 A2 12/2007

* cited by examiner

Primary Examiner — Jason S Daniels
(74) Attorney, Agent, or Firm — Cramer Patent & Design, PLLC; Aaron R. Cramer

(57) ABSTRACT

An air deflector, and tractor-trailer rigs that use the air deflector, that includes a storage tube having a vertical slot, a shaft that is located within the storage tube, and a wind screen having a first end that is operably connected to the shaft and which extends through the vertical slot. A movable support rod is attached to the end of the wind screen that extends through the vertical slot. A torsion spring biases the wind screen toward retraction. Connecting hooks extend from the movable support rod. A mounting flange attached to the storage tube can connect the storage tube to a first trailer. A stationary attachment can connect to the tractor-trailer.

14 Claims, 5 Drawing Sheets

TRACTOR-TRAILER WIND SCREEN

RELATED APPLICATIONS

The present invention is a continuation of, was first described in and claims the benefit of U.S. Provisional Application No. 62/439,230 filed Dec. 27, 2016, the entire disclosures of which are incorporated herein by reference.

FIELD OF THE INVENTION

The presently disclosed subject matter is directed to devices that improve fuel economy. More particularly, the present invention relates to a windscreen that improves the fuel economy for tractors that pull multiple trailers.

BACKGROUND OF THE INVENTION

In recent years great emphasis has been placed on improving the fuel economy of passenger vehicles, However, on a proportional basis large tractor-trailer rigs use far more fuel than passenger vehicles. While in many cases the same technological advances that have improved passenger vehicle fuel economy can be and have been used on tractor-trailer rigs there are major aerodynamic differences between those types of vehicles which limit the benefit of those advances.

Tractor-trailers are generally box-shaped. While that shape can be highly advantageous when hauling goods, the shape is aerodynamically inefficient. The poor aerodynamic efficiency of tractor-trailers combined with their height and weight results not only in poor fuel economy but also increases stresses upon engines, transmissions, and drive trains. The box-shape results in even more detrimental aerodynamic drag when the tractor is pulling multiple trailers such in tandem or triple-trailer configurations. Turbulent air streams are generated by the box-shape at highway speeds. Those air streams often get caught between trailers, resulting in even worse fuel economy and higher operating costs. Owner profits are reduced while the cost of transporting goods is increased.

Accordingly, there exists a need for devices which can improve the aerodynamic efficiency of tractors that pull multiple trailers. Beneficially such devices would reduce the effects of turbulent air streams between trailers while improving fuel economy. In practice such devices should not negatively impact turning or other maneuvering operations and should not increase visibility problems, either of the tractor operator or of others on the highway. Ideally such devices would be easy to use, suitable for being made available at relative low cost, easy to install and to remove, effective and would not endanger either the tractor operator or others on the highway.

SUMMARY OF THE INVENTION

The principles of the present invention provide for a device which can reduce the aerodynamic drag of tractors that pull multiple trailers. Beneficially that device reduces the effects of turbulent air streams between trailers while improving fuel economy. In practice the present invention does not negatively impact turning or other maneuvering operations and does not increase visibility problems, either of the tractor operator or others on the highway. The present invention is easy to use, suitable for being made available at relative low cost, easy to install and to remove, effective and does not endanger either the tractor operator or others on the highway.

An air deflector that is in accord with the present invention includes a storage tube having a vertical slot, a shaft that is located within the storage tube, and a wind screen having a first end that is operably connected to the shaft and which extends through the vertical slot. Also included is a movable support rod that is attached to the end of the wind screen that extends through the vertical slot. A torsion spring biases the wind screen toward retraction. Connecting hooks extend from the movable support rod.

The air deflector beneficially includes a top cap over the storage tube and a mounting flange that is attached to the storage tube. The mounting flange includes mounting holes for receiving fasteners. In practice the wind screen is coiled around the shaft. Also included may be a stationary attachment for receiving the connecting hooks. That stationary attachment beneficially includes a rod and standoffs for connecting the stationary attachment to a vehicle. Preferably the wind screen is comprised of a textile while the shaft is centrally located in the storage tube.

A tractor-trailer rig that is in accord with the present invention includes a tractor and a first trailer and a second trailer that are pulled by the tractor. Further included is a storage tube having a vertical slot and which is connected to the first trailer. A shaft is located within the storage tube. Also included is a wind screen having a first end that is operably connected to the shaft and a second and which extends through the vertical slot. A movable support rod is attached to the second end while a torsion spring biases the wind screen toward retraction. Connecting hooks extend from the movable support rod which is connected to the second trailer.

The tractor-trailer rig beneficially includes a top cap over the storage tube and a mounting flange attaches the storage tube to the first trailer. In practice the wind screen is coiled around the shaft. Also included may be a stationary attachment that is attached to the second trailer and which receives the connecting hooks. That stationary attachment beneficially includes a vertical rod and standoffs for connecting the stationary attachment to the second trailer. Preferably the wind screen is comprised of a textile while the shaft is centrally located in the storage tube.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
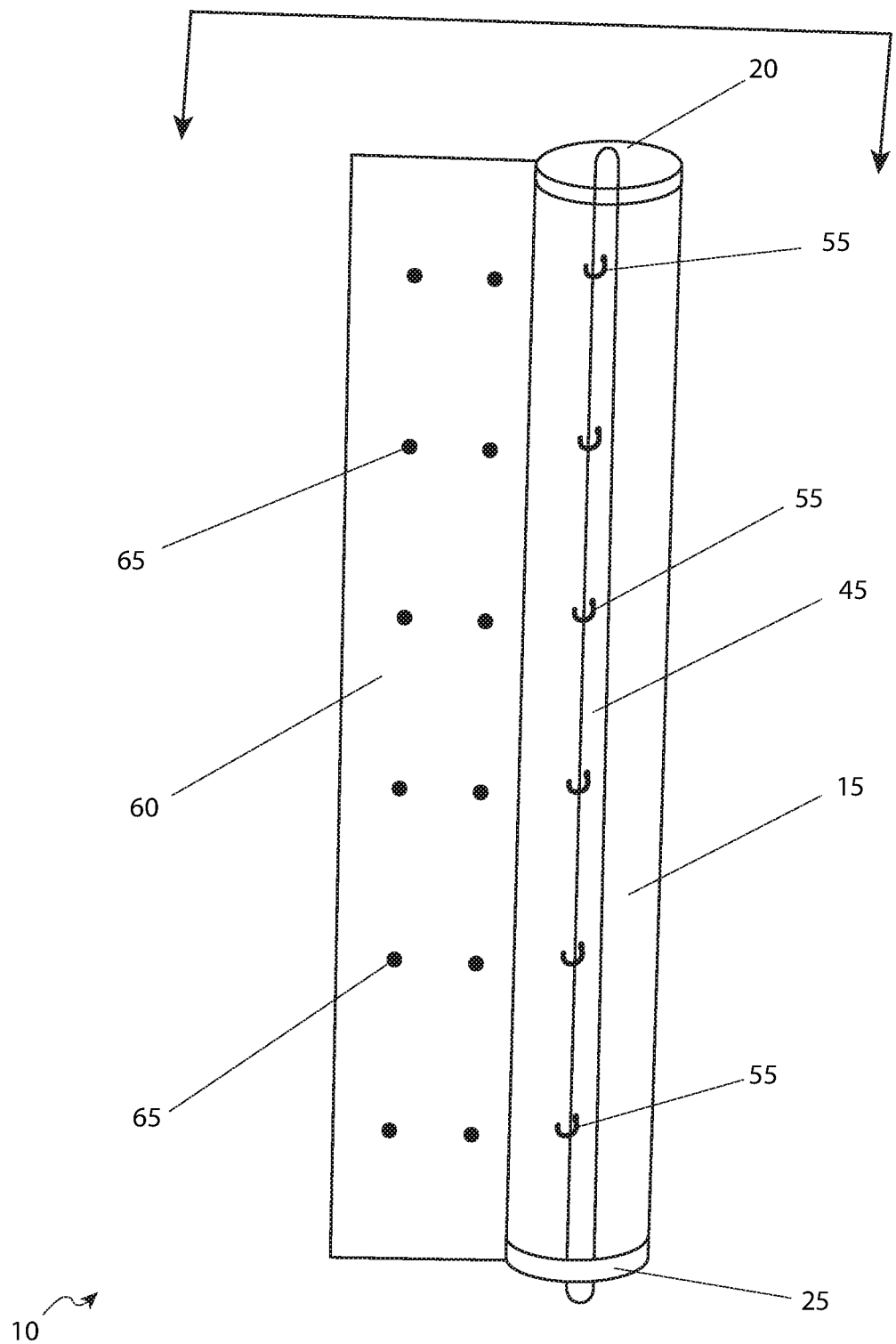
FIG. 1 presents a side view of an air deflector 10 that is in accord with the principles of the present invention.

DESCRIPTIVE KEY 10 air deflector
15 storage tube 20 top cap
25 bottom cap
30 wind screen
35 central shaft
40 torsion spring
45 movable support rod
50 vertical slot opening
55 connecting hook
60 mounting flange
65 mounting hole
70 fasteners
75 stationary attachment
80 cylindrical rod
85 rear vertical edge
90 standoff
95 travel path "r"
100 tandem tractor trailer rig
105 tractor
110 front trailer
115 back trailer
120 leading vertical edge
135 sleek air stream on path "p"
140 left wind screen
145 right wind screen

DETAILED DESCRIPTION OF THE PREFERRED EMBODIMENT

The preferred embodiment of the present invention is depicted in FIG. 1 through FIG. 5. However, the invention is not limited to the specifically described embodiment. A person skilled in the art will appreciate that many other embodiments of the invention are possible without deviating from the basic concept of the invention. Any such work around will also fall under the scope of this invention.

In the figures like numbers refer to like elements throughout. Additionally, the terms "a" and "an" as used herein do not denote a limitation of quantity, but rather denote the presence of at least one (1) of the referenced items.

Figure 2:
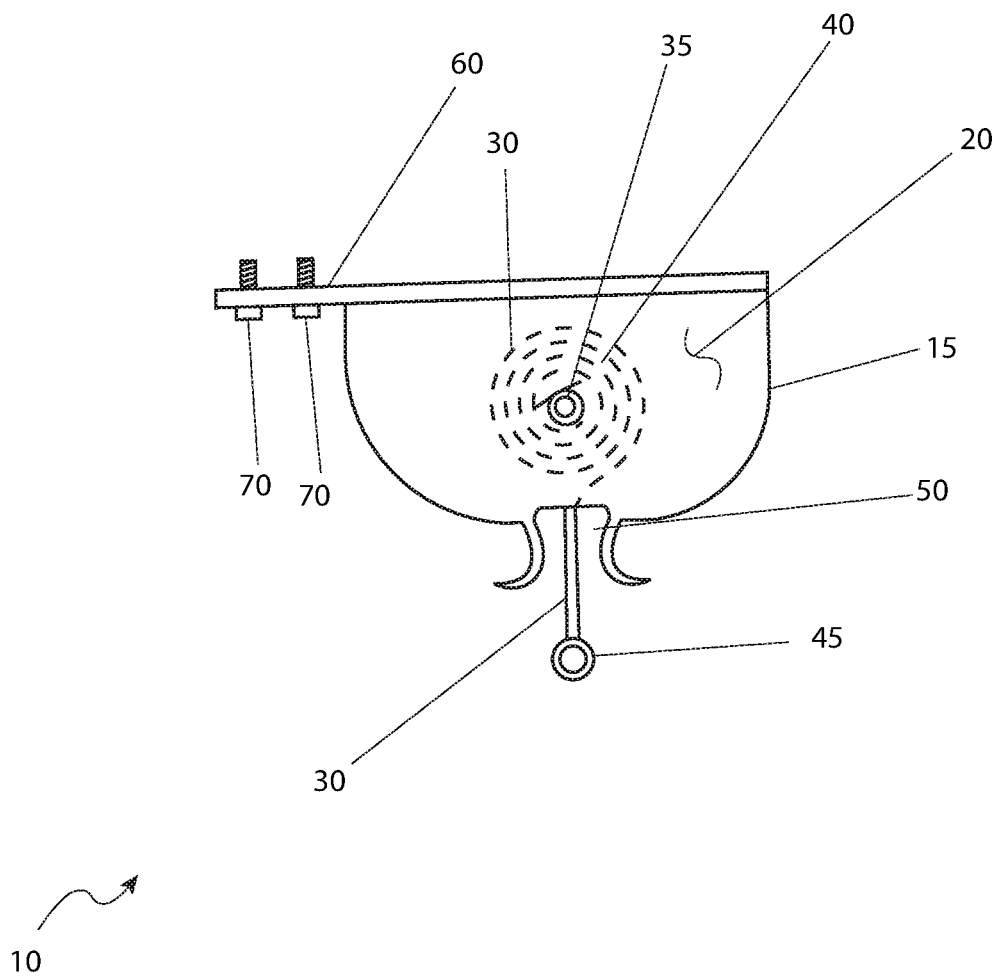
FIG. 2 shows a top down view of the air deflector 10 shown in FIG. 1.

Refer now to the side view of FIG. 1 and to the top down view of FIG. 2 for illustrations of an air deflector 10 suitable for use with tractors pulling multiple trailers. The air deflector 10 includes a storage tube 15 with a top cap 20 and a bottom cap 25. The storage tube 15 contains a wind screen 30 (FIG. 2) which is described in more detail subsequently. The top cap 20 and the bottom cap 25 provide weatherproofing and protection for a central shaft 35 (FIG. 2) and a torsion spring 40 (FIG. 2). A movable support rod 45 is located adjacent the vertical slot opening 50.

The movable support rod 45 is physically connected to the wind screen 30. The movable support rod 45 has connecting hooks 55 whose function is described below. In addition, a mounting flange 60 having a set of mounting holes 65 is attached to the storage tube 15.

FIG. 2 best shows the arrangement of the storage tube 15 relative to the mounting flange 60. As shown there are fasteners 70 that pass through the mounting holes 65. While FIG. 2 shows the fasteners as bolts other types of fasteners 70 such as screws, rivets, or the like may also be used. In FIG. 2 the wind screen 30 is shown partially extending from the storage tube 15 by passing through the vertical slot opening 50 (also see FIG. 1) with the remainder of the wind screen 30, shown in hidden lines, coiled around the central shaft 35. The torsion spring 40 biases the wind screen 30 to retract. The wind screen 30 functions similar to a pull-down window shade or movie screen except that the wind screen 30 does not have a ratcheting locking mechanism. Preferably the wind screen 30 is made of a flexible yet durable textile such as vinyl, plastic, or coated weather proof canvas.

As noted the wind screen 30 is biased by the torsion spring 40 to retract. To prevent the wind screen 30 from retracting when the wind screen is extended from the vertical slot opening 50 the connecting hooks 55 are physically connected to a front trailer 110 (see FIG. 3 through FIG. 5) via a stationary attachment 75. The result is that the wind screen 30 is constantly pulled taut by the torsion spring 40 the wind screen 30 can be pulled and held out by the connecting hooks 55.

Figure 3:
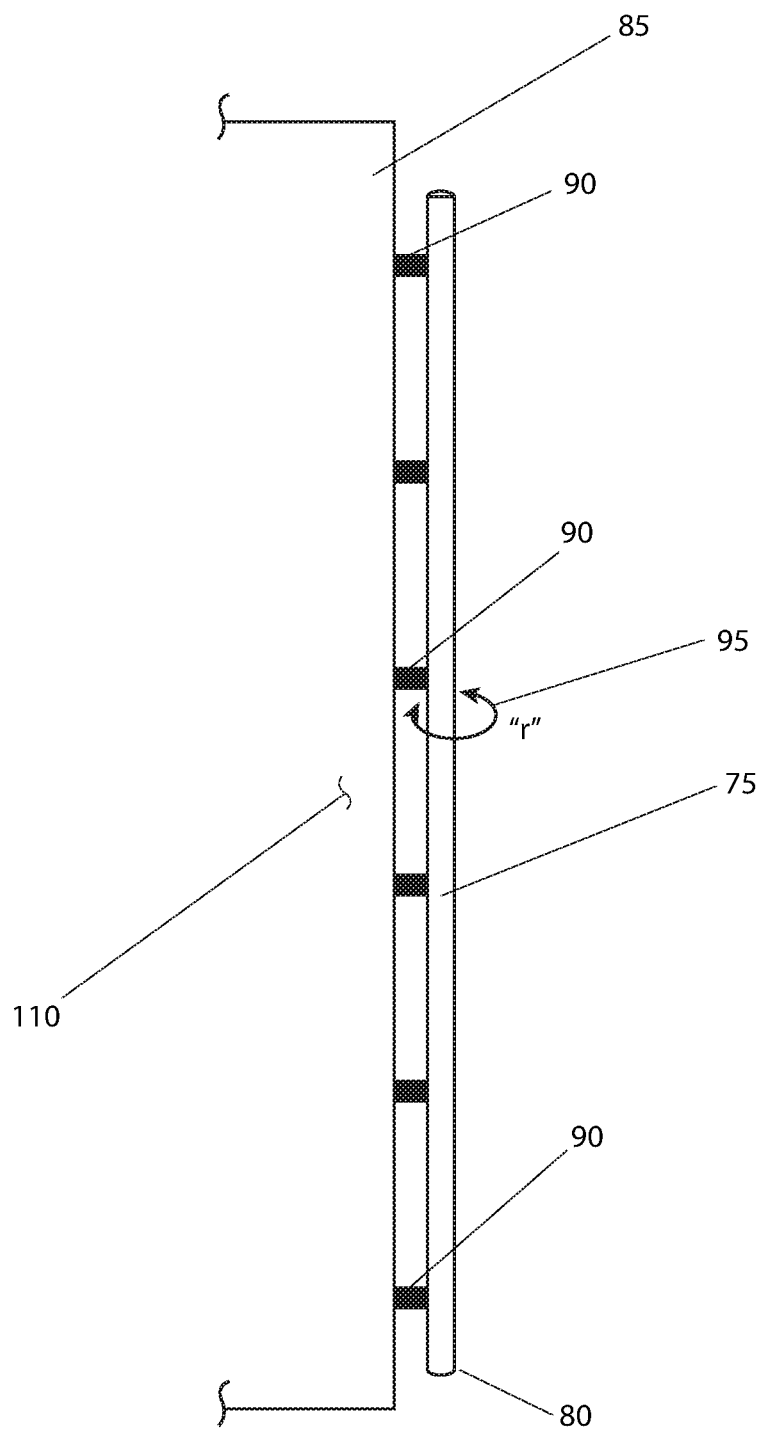
FIG. 3 illustrates a stationary attachment 75 of the air deflector 10 shown in FIG. 1 and FIG. 2 when the stationary attachment bar is attached to a rear edge of a trailer.

Refer now to FIG. 3 for a view of a stationary attachment 75 of the air deflector 10. The stationary attachment 75 consists of a cylindrical rod 80 such as solid bar or pipe with the approximate diameter of one inch (1 in.). The stationary attachment 75 is connected to the rear vertical edge 85 of the front trailer 110 via a series of standoffs 90. Those standoffs 90 may be welded to the front trailer 110. The stationary attachment 75 provides an attachment point for the connecting hooks 55 (see FIG. 1 and FIG. 2) while allowing for rotational movement defined by a travel path "r" 95 as is explained in more detail subsequently. It should be noted that the stationary attachment 75 and standoffs 90 provide a low-profile design that is designed to not interfere with other systems, items, and assemblies that are commonly used in the trucking industry, such as rear tail fairings, dock seals, dock shelters, or the like.

Figure 4:
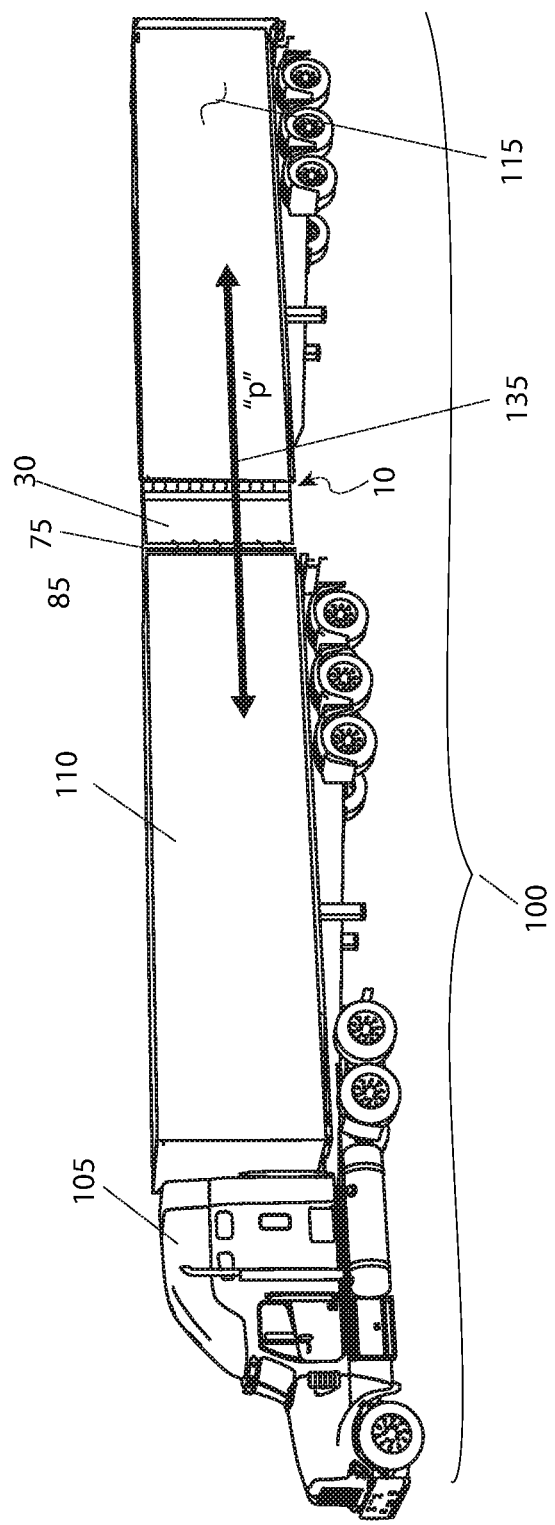
FIG. 4 is a side view of the air deflector 10 shown on a tandem tractor trailer rig 100; and, FIG. 5 presents a perspective view of the tandem tractor trailer rig of FIG. 4 during a turn.

FIG. 4 shows a tandem tractor trailer rig 100 that uses the air deflector 10. The tandem tractor trailer rig 100 includes a tractor 105, the front trailer 110, and a back trailer 115. The air deflector 10 is located between the front trailer 110 and the back trailer 115. The air deflector 10 should be used in pairs, one on each side of the tandem tractor trailer rig 100. The air deflector 10 can also be used on triple tractor trailer rigs. In such applications air deflectors 10 would be located between all trailers. While FIG. 4 only depicts an air deflector 10 on the left side of the tandem tractor trailer rig 100 due to illustrative limitations, FIG. 5 shows an air deflector 10 on each side (as provided by the left wind screen 140 and by the right wind screen 145).

Still referring to FIG. 4, a stationary attachment 75 is connected to the rear vertical edge 85 of the front trailer 110. The balance of the air deflector 10 (see FIG. 1 and FIG. 2) primarily the storage tube 15, the mounting flange 60, and the wind screen 30 is attached to the leading vertical edge 120 of the back trailer 115 by fasteners 70. As previously noted the movable support rod 45 allows for the attachment of the connecting hooks 55 around the stationary attachment 75. This results in the wind screen 30 providing a generally smooth surface between the left side of the front trailer 110 and the left side of the back trailer 115. That smooth surface creates a sleek air stream on path "p" 135 which reduces turbulence between the front trailer 110 and the back trailer 115 and thus improves fuel efficiency and reduces exhaust emissions.

Figure 5:
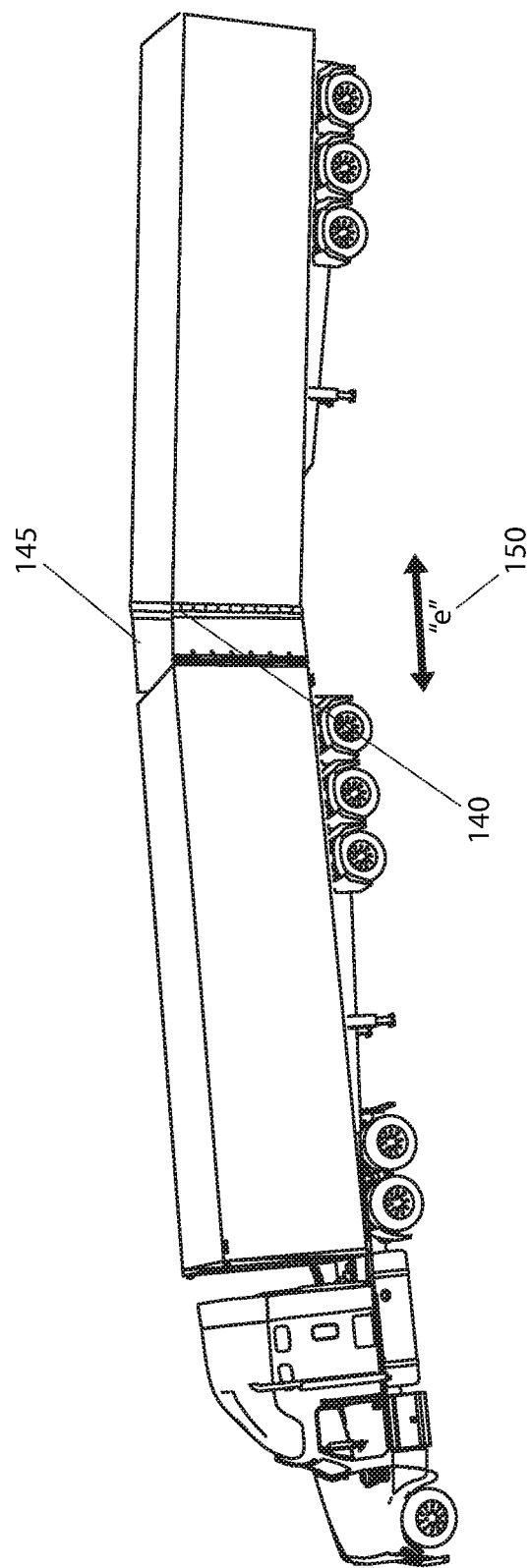

FIG. 5 presents a perspective view of the air deflector 10 being used on a tandem tractor trailer rig 100 during a turn. FIG. 5 shows two wind screens 30, which are designated as a left wind screen 140 and a right wind screen 145. The right wind screen 145 becomes more extended during the illustrated turn while the left wind screen 140 retracts. The left wind screen 140 and the right wind screen 145 automatically remain taut due to the bias applied by the torsion spring 40 (see FIG. 2).

The preferred embodiment of the present invention can be utilized by the common user in a simple and effortless manner with little or no training. It is envisioned that the air deflector 10 would be constructed and installed in general accordance with FIG. 1 through FIG. 5. Two air deflectors 10 would be procured and installed upon any trailers designed for use, with one air deflector 10 installed on the right side and the other on the left. The air deflector 10 is then ready for deployment and utilization.

During deployment the front trailer 110 and the back trailer 115 (as well as any additional trailers should they be utilized) would be hitched together in a normal manner Next, the user would grasp a movable support rods 45 and pull it outward and attach its connecting hooks 55 to a stationary attachment 75. That process would be repeated on the other air deflector 10. The air deflectors 10 are then ready for use.

As a tandem tractor trailer rig 100 equipped with the air deflector 10 travels down the road sleek air streams on path "p" 135 would be created. This prevents turbulent air streams from being generated between the front trailer 110 and the back trailer 115. Improved aerodynamic efficiency and fuel economy results. When not needed the wind screens 30 can be unhooked and automatically retract into the storage tube 15 until needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An air deflector, comprising:
   a storage tube having a vertical slot;
   a shaft within said storage tube;
   a wind screen having a first end operably connected to said shaft, said wind screen having a second end that extends through said vertical slot;
   a movable support rod attached to said second end;
   a torsion spring biasing said wind screen toward attraction;
   a plurality of connecting hooks on said movable support rod;
   an attachment for receiving and allowing rotational movement of said connecting hooks;
   a mounting flange attached to said storage tube; and
   wherein said mounting flange includes mounting holes for receiving fasteners.

2. The air deflector according to claim 1, further comprising a top cap over said storage tube.

3. The air deflector according to claim 1, wherein said wind screen is coiled around said shaft.

4. The air deflector according to claim 1, wherein said stationary attachment includes a rod.

5. The air deflector according to claim 4, further including standoffs attached to said rod, said standoffs connecting said stationary attachment to a vehicle.

6. The air deflector according to claim 1, wherein said shaft is centrally located in said storage tube.

7. The air deflector according to claim 1, wherein said wind screen is comprised of a textile.

8. A tractor trailer rig, comprising:
   a tractor;
   a first trailer pulled by said tractor;
   a second trailer pulled by said tractor;
   a storage tube having a vertical slot, said storage tube connected to said first trailer;
   a shaft within said storage tube;
   a wind screen having a first end operably connected to said shaft and a second end that extends through said vertical slot;
   a movable support rod attached to said second end;
   a torsion spring biasing said wind screen toward retraction;
   a plurality of connecting hooks on said movable support rod, said connecting hooks operatively connected to said second trailer;
   an attachment for receiving and allowing rotational movement of said connecting hooks attached to said second trailer; and
   a mounting flange attached to said storage tube;
   wherein said mounting flange includes mounting holes for receiving fasteners.

9. The tractor trailer rig according to claim 8, further comprising a top cap over said storage tube.

10. The tractor trailer rig according to claim 8, wherein said wind screen is coiled around said shaft.

11. The tractor trailer rig according to claim 8, wherein said stationary attachment includes a vertical rod.

12. The tractor trailer rig according to claim 11, further including standoffs attached to said rod, said standoffs connecting said stationary attachment to said second trailer.

13. The tractor trailer rig according to claim 8, wherein said shaft is centrally located in said tube.

14. The air deflector according to claim 8, wherein said wind screen is comprised of a textile.

\* \* \* \* \*